United States Patent
Grunin et al.

(10) Patent No.: US 8,578,470 B2
(45) Date of Patent: Nov. 5, 2013

(54) AUTHENTICATION SCHEMA FOR COMPUTER SECURITY

(75) Inventors: Galina Grunin, Briarcliff Manor, NY (US); Dmitry A. Rekesh, Castro Valley, CA (US); Gregory Vilshansky, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/048,997

(22) Filed: Mar. 16, 2011

(65) Prior Publication Data

US 2012/0240217 A1  Sep. 20, 2012

(51) Int. Cl.
*G06F 17/00* (2006.01)
*G06F 7/00* (2006.01)
*G06F 12/00* (2006.01)

(52) U.S. Cl.
USPC .............................. 726/16; 726/18; 709/224

(58) Field of Classification Search
USPC ................................ 726/2–25; 709/217–228
See application file for complete search history.

(56) References Cited

U.S. PATENT DOCUMENTS

| | | | |
|---|---|---|---|
| 7,337,466 B2 | 2/2008 | Light et al. | |
| 2005/0171851 A1 | 8/2005 | Applebaum et al. | |
| 2007/0250920 A1* | 10/2007 | Lindsay | 726/7 |
| 2008/0184346 A1* | 7/2008 | Pinkas et al. | 726/5 |
| 2008/0184363 A1* | 7/2008 | Narasimhan | 726/18 |
| 2008/0244700 A1 | 10/2008 | Osborn et al. | |
| 2008/0244708 A1* | 10/2008 | Wilkie et al. | 726/4 |
| 2008/0263641 A1* | 10/2008 | Dinh et al. | 726/5 |
| 2009/0038006 A1 | 2/2009 | Traenkenschuh et al. | |
| 2009/0187970 A1* | 7/2009 | Mower et al. | 726/3 |
| 2009/0259588 A1* | 10/2009 | Lindsay | 705/40 |
| 2009/0282258 A1* | 11/2009 | Burke et al. | 713/184 |
| 2009/0319776 A1* | 12/2009 | Burch et al. | 713/155 |
| 2009/0320124 A1 | 12/2009 | Taxier et al. | |
| 2010/0017616 A1* | 1/2010 | Nichols et al. | 713/183 |
| 2010/0043062 A1 | 2/2010 | Alexander et al. | |
| 2010/0043065 A1* | 2/2010 | Bray et al. | 726/8 |
| 2010/0286997 A1* | 11/2010 | Srinivasan | 705/2 |
| 2011/0078766 A1* | 3/2011 | Schachter | 726/3 |
| 2011/0099616 A1* | 4/2011 | Mazur et al. | 726/7 |
| 2011/0271332 A1* | 11/2011 | Jones et al. | 726/7 |
| 2011/0296194 A1* | 12/2011 | Herkes et al. | 713/185 |
| 2012/0011370 A1* | 1/2012 | Duke | 713/183 |
| 2012/0117660 A1* | 5/2012 | Domany et al. | 726/28 |
| 2012/0185920 A1* | 7/2012 | Zmener | 726/4 |

* cited by examiner

*Primary Examiner* — Haresh N Patel
(74) *Attorney, Agent, or Firm* — Cantor Colburn LLP; Dwayne Nelson

(57) ABSTRACT

Computer security processes include displaying information elements on a computer display screen. Some of the information elements are mapped to corresponding parameters. The computer security processes also include receiving a selected information element from the information elements displayed on the computer display screen, and determining a value of a parameter associated with the selected information element based on a condition. The value of the parameter is changeable according to changes in the condition. The computer security processes further include comparing the selected information element with the value of the parameter, and upon determining the value of the parameter matches the selected information element, providing a user with access to a system resource.

19 Claims, 3 Drawing Sheets

AUTHENTICATION SCHEMA FOR COMPUTER SECURITY

BACKGROUND

The present invention relates to computer security, and more specifically, to authentication of users of a computing system.

When a user attempts to log in to a computer system, a typical authentication process requires that the user enter a password or provide answers to selected questions. However, this activity can be easily detected or observed when the user is in a public place (e.g., airport, coffee shop, ATM, or any place with public data access facilities) and, unbeknownst to the user, the information can be procured for use by the observer.

What is needed, therefore, is an authentication mechanism that prevents or minimizes unauthorized procurement of computer access information.

SUMMARY

According to one embodiment of the present invention, a method for implementing computer security is provided. The method includes displaying information elements on a computer display screen. Some of the information elements are mapped to corresponding parameters. The method also includes receiving a selected information element from the information elements displayed on the computer display screen, and determining a value of a parameter associated with the selected information element based on a condition. The value of the parameter is changeable according to changes in the condition. The method further includes comparing the selected information element with the value of the parameter, and upon determining the value of the parameter matches the selected information element, providing a user with access to a system resource.

According to another embodiment of the present invention, a system for implementing computer security is provided. The system includes a computer processor and an authentication application executable by the computer processor. The authentication application performs a method. The method includes displaying information elements on a computer display screen. Some of the information elements are mapped to corresponding parameters. The method also includes receiving a selected information element from the information elements displayed on the computer display screen, and determining a value of a parameter associated with the selected information element based on a condition. The value of the parameter is changeable according to changes in the condition. The method further includes comparing the selected information element with the value of the parameter, and upon determining the value of the parameter matches the selected information element, providing a user with access to a system resource.

According to a further embodiment of the present invention, a computer program product for implementing computer security is provided. The computer program product includes a storage medium embodied with computer-readable program code, which when executed by a computer causes the computer to implement a method. The method includes displaying information elements on a computer display screen. Some of the information elements are mapped to corresponding parameters. The method also includes receiving a selected information element from the information elements displayed on the computer display screen, and determining a value of a parameter associated with the selected information element based on a condition. The value of the parameter is changeable according to changes in the condition. The method further includes comparing the selected information element with the value of the parameter, and upon determining the value of the parameter matches the selected information element, providing a user with access to a system resource.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments of the invention provide an authentication mechanism that prevents or minimizes unauthorized procurement of computer access information. The exemplary embodiments display information elements on a computer display screen. Some of the information elements are mapped to corresponding parameters, which may be defined according to varying types of authentication schema. A user who is attempting to log in to a system selects one or more of the information elements from the display screen. The computer security processes receives the selected information element(s) and determines a value of a parameter associated with the selected information element(s) based on a condition. The authentication schema provides for variability of the parameter according to changes in the condition. The computer security processes compare the selected information element(s) with the value of the parameter, and upon determining the value of the parameter matches the selected information element, the computer security processes provide the user with access to a system resource.

Figure 1:
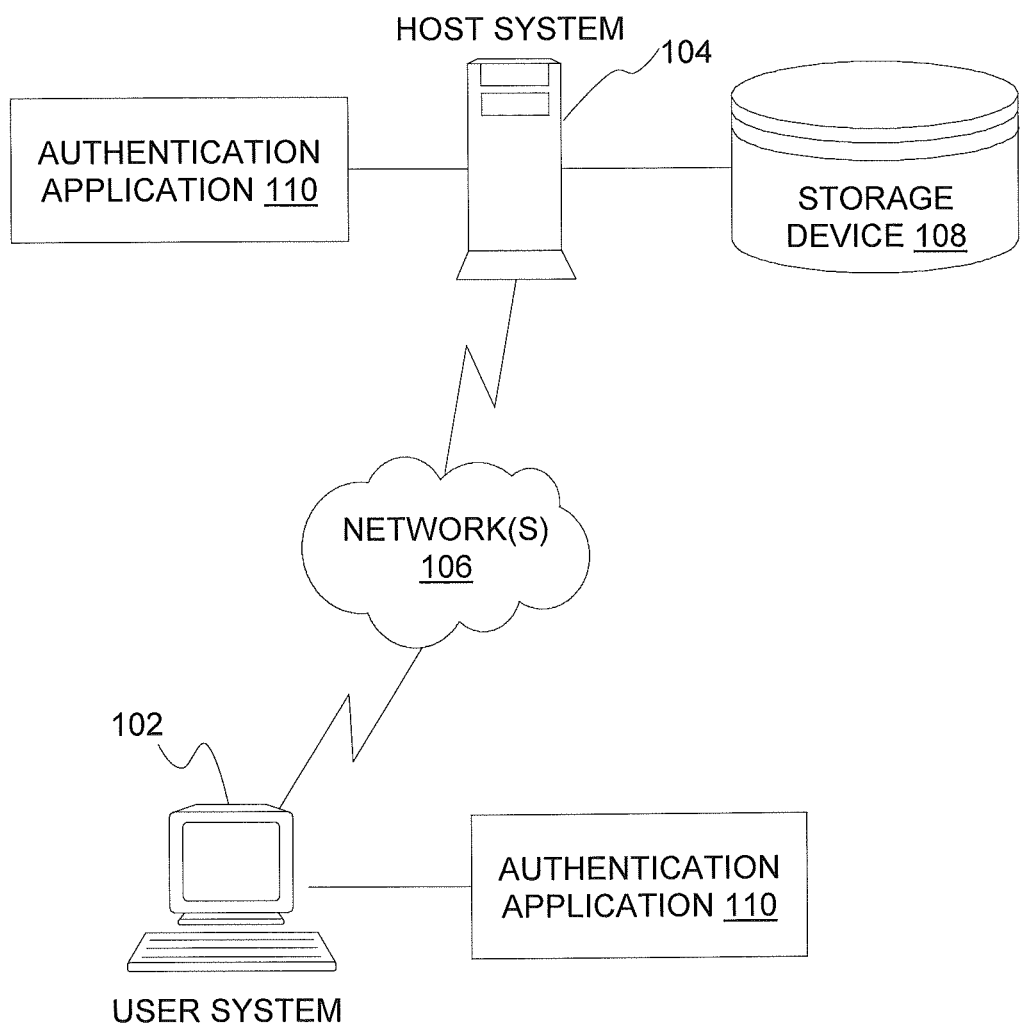
FIG. 1 depicts a block diagram of a system upon which computer security processes may be implemented in an exemplary embodiment.

With reference now to FIG. 1, an exemplary system upon which the computer security processes may be implemented will now be described. The system of FIG. 1 includes a user system 102 in communication with a host system 104 over one or more networks 106. The user system 102 represents a computer processing device through which a user may contact the host system 104. The user system 102 may be implemented using a general-purpose computer executing a computer program for carrying out the processes described herein. The user system 102 may be a personal computer (e.g., a lap top, a personal digital assistant) or host attached terminal. If the user system 102 is a personal computer, the processing described herein may be shared by the user system 102 and the host system 104 (e.g., by providing an applet to the user system 102). In one exemplary embodiment, the user system 102 executes computer instructions for performing the computer security processes described herein (via, e.g., an authentication application 110). In another exemplary embodiment, the host system 104 executes computer instructions for performing the computer security processes (via, e.g., the authentication application 110).

In an exemplary embodiment, the host system 104 is also communicatively coupled to a storage device 108. The storage device 108 may be implemented using a variety of devices for storing electronic information. It is understood that the storage device 108 may be implemented using memory contained in the host system 104 or that it may be a separate physical device (e.g., as shown in FIG. 1). The storage device 108 is logically addressable as a consolidated data source across a distributed environment that includes network (s) 106. Information stored in the storage device 108 may be retrieved and manipulated via the host system 104 and/or via the user system 102. In one exemplary embodiment, the storage device 108 stores applications, information elements, and parameters (which collectively represent one or more authentication schemas), as well as user preferences that facilitate the computer security processes described further herein.

The network(s) 106 may be any type of known networks including, but not limited to, a wide area network (WAN), a local area network (LAN), a global network (e.g. Internet), a virtual private network (VPN), and an intranet. The network 106 may be implemented using a wireless network or any kind of physical network implementation known in the art. The user system 102 may be coupled to the host system through multiple networks (e.g., intranet and Internet). One or more user systems and the host system 104 may be connected to the network 106 in a wireless fashion. In one embodiment, the network is an intranet and one or more user systems execute a user interface application (e.g., a web browser) to contact the host system 104 through the network 106. In another exemplary embodiment, one or more of the user systems 102 is connected directly (i.e., not through the network 106) to the host system 104 and the host system 104 is connected directly to or contains the storage device 108.

The data repository includes one or more databases containing documents, files, and related data in support of the computer security processes. In one exemplary embodiment, the computer security processes are configured to allow users to select from various authentication schemas that are implemented in an authentication process, as described further herein. In this embodiment, the user system 102 and/or the storage device 108 may store user profile records, which house the authentication schema (e.g., information elements, parameters, information elements) selected for use. In another embodiment, the host system 104 may dictate which authentication schema may be implemented for a particular user system 102. In yet a further embodiment, multiple authentication schema may be selected and implemented interchangeably, e.g., a different schema used for each log in attempt. The user profile records may also include, e.g., e.g., personal/identification information related to the user of user system 102, as well as the user system 102 operated by the user (e.g., an Internet address assigned to the user device), which may be used for various purposes, such as identifying a geographic location of the user system 102, as will be described further herein.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks.

The host system 104 may also operate as an application server. As described above, the host system 104 may execute one or more computer programs to provide the computer security processes, e.g., authentication application 110. Processing may be shared by the user system 102 and the host system 104 by providing an application (e.g., java applet) to the user system 102. Alternatively, the user system 102 can include stand-alone software applications for performing a portion or all of the processing described herein. As previously described, it is understood that separate servers may be utilized to implement the network server functions and the application server functions. Alternatively, the network server and the application server may be implemented by a single server executing computer programs to perform the requisite functions.

In one embodiment, the authentication application 110 provides a user interface that enables users to customize or configure the authentication schema to be implemented. The user profile records may be used to store information derived via the user interface as indicated above.

Figure 2:
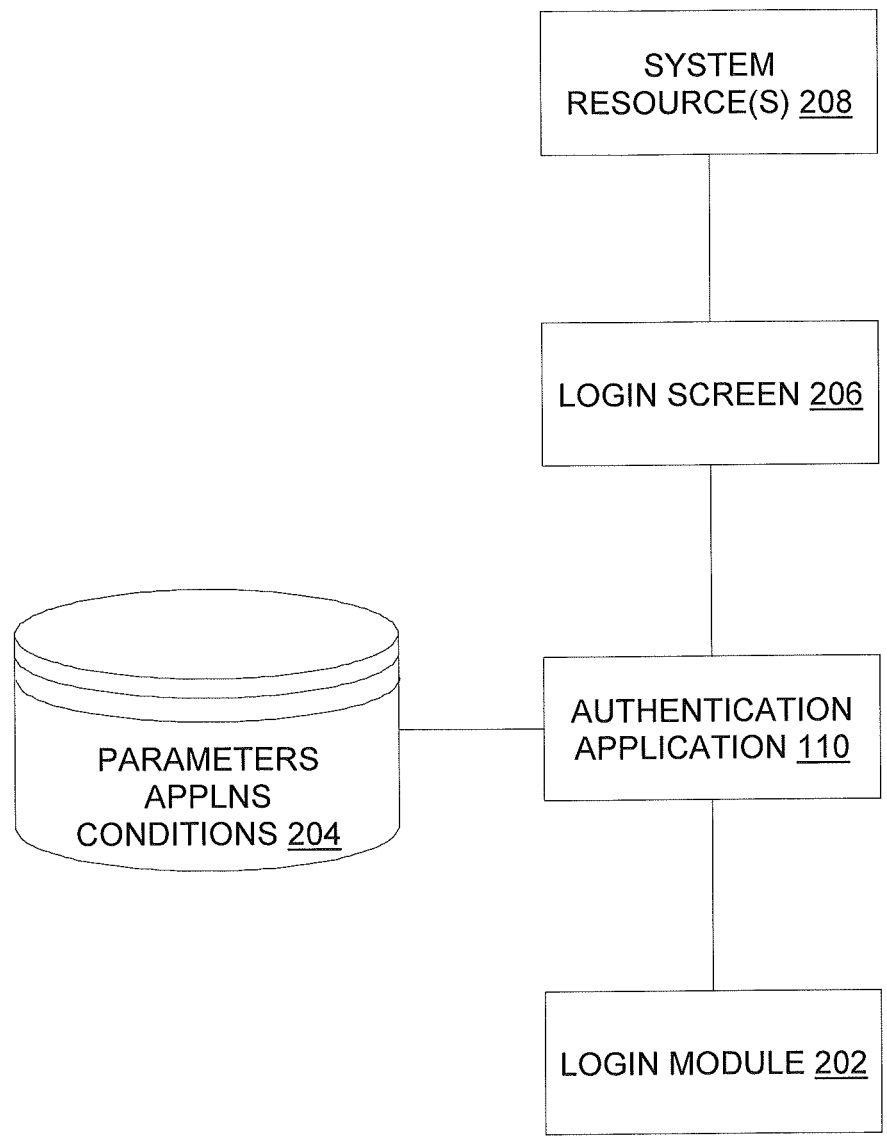
FIG. 2 depicts a block diagram of a portion of the components of the system of FIG. 1.

The exemplary computer security processes may be implemented by various components of the system 100 of FIG. 1. Turning now to FIG. 2, a portion of these components will now be described in an exemplary embodiment.

A login module 202 may reside locally on the user system 102 and implemented by the user system 102 as part of the user system's 102 operating system (e.g., BIOS). In this embodiment, system resources 208 sought for access by a user may be the applications and data that reside on the user system 102 itself. Other system resources 208 may include peripheral devices, such as back up storage devices, printers, facsimile machines, or other devices communicatively coupled to the user system 102 (e.g., in a wireline or wireless fashion). Still other system resources 208 may include communication devices managed by the user of the user system 102, e.g., the user's smart phone, intelligent home appliances, home safety systems, or entertainment devices, such as digital video recording devices or Internet appliances.

In another exemplary embodiment, the login module 202 may reside on the host system 104 whereby the user system 102 implements a login process to access the host system 104 resources 208 (e.g., applications, storage systems, network computers, and/or peripheral network devices) that are managed by the host system 104 over one or more networks 106.

The authentication application 110 may be implemented as an application programming interface (API) to the login module 202 or may be integrated therewith as a single tool. Once the login module 202 is activated, e.g., a user is attempting a login process, the authentication application 110 and/or the integrated login module 202 and authentication application 110 displays a login screen 206 on the user system 102. The authentication application 110 accesses information such as parameters, information elements, applications, etc. from one or more databases 204 for presentation on the login screen 206. For example, in one embodiment, the authentication schema is a clock or time feature. The applications associated with the authentication schema may include a clock application (e.g., atomic clock). The parameters hold values that specify 'time,' and the value changes based upon changes in a condition, whereby the condition reflects the passage of time. For example, in one embodiment, the information elements represent a matrix of numbers (e.g., four-by-four matrix) that visually depict the numbers as they would appear on the face of a clock (i.e., the outer cells of the matrix display numbers 1-12 in a clockwise sequence starting from the top cell of the matrix), as follows:

```
 1  2  3  4
12 13 14  5
11 16 15  6
10  9  8  7
```

In this embodiment, the parameter is time, and a variable condition is determined for the value of the parameter. That is, the current time at which the user is attempting the login is determined and is assigned as the value of the parameter 'time.' This value changes depending upon the time the user is attempting to log in to the user system 102. At login, the authentication application 110 accesses a clock application and is used to determine the value of the parameter as the user is selecting the number (information element) that reflects the current time as the password.

The parameters, information elements, applications 204 may be stored locally on the user system 102 (e.g., in internal memory) or may be stored at the host system 104 (e.g., in storage device 108).

Once the user login process has been successfully implemented, the user is provided with access to one or more system resources 208.

As indicated above, multiple authentication schemas may be employed for a single user system or for access to the host system 104. That is, information elements, parameters, applications, etc. used may vary for each login attempt or may be selected by the user system 102 or host system 104, or a combination thereof.

Figure 3:
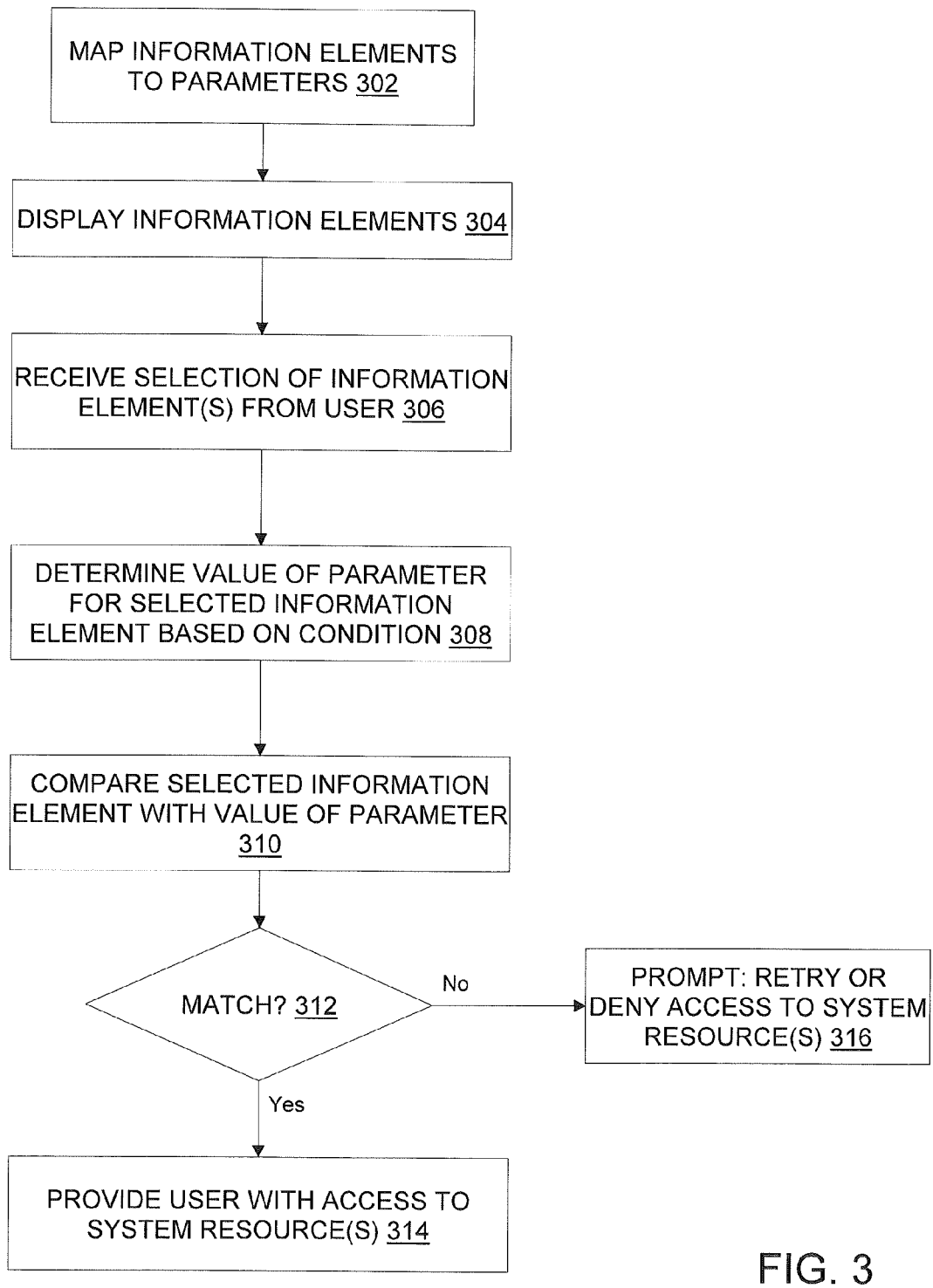
FIG. 3 depicts a flow diagram describing a process for implement computer security processes in an exemplary embodiment.

Turning now to FIG. 3, an exemplary process for implementing the computer security system will now be described. In step 302, the computer security processes perform a set up phase, which configures parameters and maps information elements to these parameters. Steps 304-316 describe an exemplary authentication process performed using an authentication scheme provided via the computer security processes.

At step 302, information elements are mapped to parameters. Parameters, in turn, will have values that dynamically change based upon one or more conditions. The type of information elements and parameters employed are based upon the type of authentication schema desired, as will be described further herein.

A user at user system 102 begins a log in process. At step 304, the authentication application 110 (e.g., in conjunction with the login module 202) displays information elements on a display screen of the user system 102. The information elements may be displayed on login screen 206.

At step 306, the authentication application 110 receives a selection of one or more of the information elements displayed on the display screen. Using the clock authentication schema described above, for example, the information elements may be a four-by-four matrix of numbers that visually depict the face of a clock. If the current time were 12:00 pm, the user would select the number 12 from the information elements on the display screen.

At step 308, the authentication application 110 determines value of the parameter based upon a condition. The value of the parameter 'time' is the current time. In one embodiment, the authentication application 110 accesses an application (e.g., a clock program) from the applications stored in databases 204. The authentication application 110 determines the current time and passes this value as the parameter value for the authentication process.

At step 310, the authentication application 110 compares the selected information element to the value of parameter.

At step 312, the authentication application 110 determines if the selected information element matches the value of the parameter. If so, at step 314, the authentication application 110 provides the user with access to a system resource (e.g., system resource 208). Alternatively, in one exemplary embodiment, the authentication application 110 may provide another set of information elements in which the process described in steps 304-312 are repeated for a second level of security.

At step 316, if the selected information element does not match the value of the parameter, the user may be prompted to retry (e.g., given an option to select another information element or provided with a new and different set of information elements) or the user may be denied access.

Using the time authentication schema, the user may conceivably select two different information elements during two separate login attempts depending upon the changing condition (i.e., passage of time). In other words, the information elements selected will change if the time of login changes, essentially creating a new password at each log in. In this manner, one who may be observing the first login would not be able to procure this password (i.e., selected information element) for appropriation unless the observer happened to attempt to login at the same time that the user logged in; i.e., the password changes depending upon the time of login.

In addition to the clock authentication schema mentioned above, other types of authentication schema will now be described. In one exemplary embodiment, a weather authentication schema may be employed. In this embodiment, the parameter holds a value that corresponds to the current local weather (e.g., the weather conditions determined at the time and place of the user's login). The information elements may include graphical icons that depict varying weather conditions (e.g., a sun, a cloud, a cloud with rain, etc.) The authentication application 110 may access a weather application (e.g., one of the applications stored in databases 204) to determine the current local weather. In one embodiment, the locale of the user system may be determined using pre-defined location information entered by the user in the weather application (e.g., zip code) that is saved by the weather application. In another embodiment, the locale of the user may be determined by searching other applications or processes on the user system 102 (e.g., information provided by a Wi-fi hot spot that communicates the location information to the user system 102).

Using the weather authentication schema, the user selects a sun icon from the information elements, which is compared with the parameter value determined by the weather application, and a comparison of the selected information element and the parameter value is made to authenticate the user with the system. Again, as indicated above, the icon selected changes based upon changing conditions, where in this embodiment the changing conditions reflect changes in the weather.

In another authentication schema, a multi-media file is presented that includes the information elements. In this embodiment, a sequence of images that is known to the user may be mixed in with other information elements. For example, a girl holding a kite, followed by the girl getting into a cab, and then the girl entering a red house (a sequence of three images). The sequence may be displayed along with or in sequence with other information elements. When the user sees the defined sequence, the user selects the image immediately following the sequence. This image may be different each time the sequence is displayed (e.g., the image may be randomly assigned at runtime). The parameter in this embodiment stores a value that is unknown until the image (i.e., information element) is assigned. Thus, the parameter is an unknown image or object that immediately follows a known sequence of information elements. The condition changes at each login; that is, the object that follows the sequence varies based upon random assignments at runtime. An observer who identifies the selection of the information element, e.g., a sneaker, would not be able to duplicate this password as the parameter value would change at the next login attempt (e.g., the image following the sequence may be a horseshoe).

In yet another authentication schema, the information elements may be presented as a multimedia file that depicts images and music. The information element for selection is known in advance by the user as a word that is displayed at the time the song mentions the word, 'moon.' The parameter is the unknown image associated with the word 'moon' in a song. Whenever the user hears the word 'moon' in the song, the user selects the image that is displayed at the exact time the user hears the word 'moon' in the song. The image differs for each instance of the word 'moon' in the song, such that an observer who witnesses the selection of a four-leaf clover by the user would not successfully duplicate the password as it is tied to the song and not to the image itself.

In a further authentication schema, the information elements may be presented in a maze or map on the display screen that depicts images that navigate the user through the map. A sequence of navigational markers or locations directs the user through the map (e.g., left, right, left) and is known in advance by the user. The map displays a series of images that direct the user through the map. The user selects the image that corresponds to the direction of the known sequence (e.g., left, right, left). The images may change each time the map is displayed such that an observer would not be able to duplicate the selection. For example, a banana peel corresponds to a left direction and a heart corresponds to a right direction. The user selects the banana peel as the first element in the sequence of left, right, left. The next time the user logs in to the user system 102, the banana peel may be replaced by a diamond. The user selects the image or information element that corresponds to the direction or location on the map. Thus, the parameter value corresponds to a location in the map, which in turn corresponds to the known direction navigated by the user in the authentication process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
    displaying information elements on a computer display screen, at least a portion of the information elements mapped to corresponding parameters;
    receiving a selected information element from the information elements displayed on the computer display screen;
    determining a value of a parameter associated with the selected information element based on a condition, the value of the parameter changeable according to changes in the condition;
    comparing the selected information element with the value of the parameter; and
    upon determining the value of the parameter matches the selected information element, providing a user with access to a system resource;
    wherein the parameter is weather, and the condition is a current weather condition that is local to the user at the time the user is implementing a login process, the method further comprising accessing a weather application, wherein the determining a value of a parameter comprises determining the current weather condition from the weather application, wherein the information elements comprise a plurality of weather icons representing different weather conditions;
    wherein the current weather condition that is local to the user is determined by geographical location information derived from a wireless access point through which a user system of the user is communicating.

2. The method of claim 1, wherein the parameter is clock time and the condition is a current time when the user is implementing a login process, the method further comprising:
    accessing a clock application, wherein the determining a value of a parameter comprises determining the current time from the clock application.

3. The method of claim 2, wherein the information elements comprise a matrix of numbers that visually represent hours on a clock.

4. The method of claim 2, wherein the information elements comprise cells formed by a four-by-four matrix wherein positions in outer cells of the four-by-four matrix reflect hours on a clock.

5. The method of claim 1, wherein the parameter is an unidentified information element and association with a sequence of the information elements, and the condition is a random assignment of the unidentified information element to the sequence of information elements at the time the user is implementing a login process.

6. The method of claim 5, wherein the sequence of the information elements and the value of the parameter is displayed in a multimedia file.

7. The method of claim 1, wherein the parameter is a location on a map specifying a navigational marker on the map, and the condition is a random assignment of an information element to the location on the map at the time the user is implementing a login process.

8. A system, comprising:
    a computer processor; and an application to execute on the computer processor, the application implementing a method, the method comprising:

displaying information elements on a computer display screen, at least a portion of the information elements mapped to corresponding parameters;

receiving a selected information element from the information elements displayed on the computer display screen;

determining a value of a parameter associated with the selected information element based on a condition, the value of the parameter changeable according to changes in the condition;

comparing the selected information element with the value of the parameter; and upon determining the value of the parameter matches the selected information element, providing a user with access to a system resource;

wherein the parameter is weather, and the condition is a current weather condition that is local to the user at the time the user is implementing a login process, the method further comprising accessing a weather application, wherein the determining a value of a parameter comprises determining the current weather condition from the weather application, wherein the information elements comprise a plurality of weather icons representing different weather conditions;

wherein the current weather condition that is local to the user is determined by geographical location information derived from a wireless access point through which a user system of the user is communicating.

9. The system of claim 8, wherein the parameter is clock time and the condition is a current time when the user is implementing a login process, the method further comprising:

accessing a clock application, wherein the determining a value of a parameter comprises determining the current time from the clock application.

10. The system of claim 9, wherein the information elements comprise a matrix of numbers that visually represent hours on a clock.

11. The system of claim 9, wherein the information elements comprise cells formed by a four-by-four matrix wherein positions in outer cells of the four-by-four matrix reflect hours on a clock.

12. The system of claim 8, wherein the parameter is an unidentified information element and association with a sequence of the information elements, and the condition is a random assignment of the unidentified information element to the sequence of information elements at the time the user is implementing a login process.

13. The system of claim 12, wherein the sequence of the information elements and the value of the parameter is displayed in a multimedia file.

14. The system of claim 8, wherein the parameter is a location on a map specifying a navigational marker on the map, and the condition is a random assignment of an information element to the location on the map at the time the user is implementing a login process.

15. A computer program product comprising a non-transitory storage medium embodied with computer-readable program code, which when executed by a computer cause the computer to implement a method, the method comprising:

displaying information elements on a computer display screen, at least a portion of the information elements mapped to corresponding parameters;

receiving a selected information element from the information elements displayed on the computer display screen;

determining a value of a parameter associated with the selected information element based on a condition, the value of the parameter changeable according to changes in the condition;

comparing the selected information element with the value of the parameter; and upon determining the value of the parameter matches the selected information element, providing a user with access to a system resource;

wherein the parameter is weather, and the condition is a current weather condition that is local to the user at the time the user is implementing a login process, the method further comprising accessing a weather application, wherein the determining a value of a parameter comprises determining the current weather condition from the weather application, wherein the information elements comprise a plurality of weather icons representing different weather conditions;

wherein the current weather condition that is local to the user is determined by geographical location information derived from a wireless access point through which a user system of the user is communicating.

16. The computer program product of claim 15, wherein the parameter is clock time and the condition is a current time when the user is implementing a login process, the method further comprising:

accessing a clock application, wherein the determining a value of a parameter comprises determining the current time from the clock application.

17. The computer program product of claim 16, wherein the information elements comprise a matrix of numbers that visually represent hours on a clock.

18. The computer program product of claim 16, wherein the information elements comprise cells formed by a four-by-four matrix wherein positions in outer cells of the four-by-four matrix reflect hours on a clock.

19. The computer program product of claim 15, wherein the parameter is an unidentified information element and association with a sequence of the information elements, and the condition is a random assignment of the unidentified information element to the sequence of the information elements at the time the user is implementing a login process.

* * * * *